United States Patent [19]

Paranjpe et al.

[11] Patent Number: 4,774,529

[45] Date of Patent: Sep. 27, 1988

[54] REPOSITIONABLE MARKING HEAD FOR INCREASING PRINTING SPEED

[75] Inventors: Suresh C. Paranjpe, Fremont; David A. Rottman, Hayward, both of Calif.

[73] Assignee: Xerox Corporation, Stamford, Conn.

[21] Appl. No.: 19,095

[22] Filed: Feb. 26, 1987

[51] Int. Cl.[4] .......... G01D 15/16

[52] U.S. Cl. .......... 346/140 R; 346/1.1; 400/82; 400/126

[58] Field of Search .......... 346/140 PD, 1.1; 400/82, 126

[56] References Cited

U.S. PATENT DOCUMENTS

| | | | |
|---|---|---|---|
| 4,364,067 | 12/1982 | Koto et al. | 346/140 PD |
| 4,528,576 | 7/1985 | Koumura et al. | 346/140 PD |
| 4,540,996 | 9/1985 | Saito | 346/140 PD |
| 4,576,490 | 3/1986 | Isobe | 400/82 |
| 4,593,295 | 6/1986 | Matsufuji et al. | 346/140 PD |
| 4,709,247 | 11/1987 | Piatt et al. | 400/126 |

FOREIGN PATENT DOCUMENTS

| | | | |
|---|---|---|---|
| 47671 | 3/1982 | Japan | 346/140 PD |
| 5273 | 1/1983 | Japan | 346/140 PD |

*Primary Examiner*—Clifford C. Shaw
*Assistant Examiner*—Huan H. Tran
*Attorney, Agent, or Firm*—Serge Abend

[57] ABSTRACT

A printing system for increasing the printing speed of a multi-color printer when utilized in a single color mode by repositioning a recording head cartridge from a first level to a second level so as to enable at least two lines of information to be created upon the surface to be marked during a single scanning pass when it has been determined that the cartridge mounted in the repositionable support is the same color as the single color recording head cartridge.

3 Claims, 6 Drawing Sheets

REPOSITIONABLE MARKING HEAD FOR INCREASING PRINTING SPEED

FIELD OF THE INVENTION

This invention relates to a multi-color printing system having a carriage supporting several marking heads arranged side-by-side for scanning movement, to record a line of information, across a surface to be marked. At least one of the marking heads is supported for being repositioned, in the direction transverse to the scanning direction, to enable at least two lines of information to be recorded during a single scanning pass.

BACKGROUND OF THE INVENTION

Non-impact recording methods in the form of ink jet printing, thermal transfer printing and thermal sublimation printing are presently of considerable interest because of their capability for achieving high print speeds, their quiet operation and their capability for producing full color, highlight color and monochrome recordings. The present invention will be described relative to the ink jet recording process, although it should be understood that it is equally applicable to other recording techniques employing scanning recording heads.

In such scanning type printers, the recording heads are mounted upon a reciprocable carriage which is selectively moved across the recording substrate to record a single line of information. Then the recording substrate is moved normal to the scanning direction by a single line increment and recording is repeated while scanning with the recording heads, in either the same or the opposite direction. Each recording head includes an array of mark producing elements arranged in a direction generally parallel to the direction of movement of the recording substrate. The full page is printed one full line at a time. A scanning-type printer of this type, of the monochrome variety having a single head cartridge, is disclosed in U.S. Pat. No. 4,628,332 (Matsumoto) wherein the recording head cartridge is mountable onto a cartridge holder which, in turn, is mounted on the scanning carriage.

The ink jet recording process, in the form to which the present invention applies, involves the selective propulsion of droplets of an ink recording liquid from a scanning recording head onto a spaced recording substrate (such as paper or a projection transparency) upon which it adheres and dries. Propulsion may be accomplished by any one of several known methods for imparting pressure increases to confined portions of the ink adjacent the ejection orifice. Examples of such pressure inducing devices are piezoelectric elements, acoustic generators, magnetic compressors or heater elements. The latter device, for creating a drop-on-demand, initially heats the confined ink to rapidly expand it into a bubble which then bursts, forming a pressure wave which expells a droplet quantity of ink through the nozzle orifice. This method has gained in popularity because it is possible to simply and inexpensively fabricate the nozzle orifices and driving heaters by photolithographic thin film electronic methods, so as to produce recording heads including a dense array of orifices and related drivers (e.g. 50 per 1/6 inch) for recording images of high resolution. Another advantage of the heater-type pressure transducers is their capability of very fast refiring times, enabling high speed operation.

The cartridge method of ink jet printing lends itself to full-color printing and highlight color printing as readily as it does to monochrome printing. In monochrome printing a single cartridge (usually black) is moved by the reciprocable carriage. In full-color printing, several recording head cartridges containing colored inks (yellow, cyan and magenta) are mounted for scanning movement upon the carriage along with a black ink containing cartridge. It is possible, however, to produce process black by adding the three colors. Highlight color requires only two cartridges, usually black and one other color, such as red or yellow. In U.S. Pat. No. 4,528,576 (Koumura et al) there is disclosed a full-color ink jet printer of the type including four heads. These are shown arranged in two configurations: one is the well known side-by-side orientation, and the other is a stacked orientation in which the four heads are positioned one over the other in the process (paper movement) direction, so that the arrays extend normal to the direction of scanning. In the side-by-side full color printing arrangement, the information on a single line is recorded by selectively operating all of the heads, as needed, in each line pass. In the stacked full-color arrangement a single color head is selectively fired during each line pass, so that at least three passes are necessary to complete the information needed for each line. When it is desred to accomplish monochrome printing with the full-color and highlight color devices, a single recording head (usually black) is fired for each line pass. All other cartridges will be inoperative.

During the design phase of the development of an ink jet scanning printer, the maximum speed of recording is achieved by optimizing the several operational parameters which control the maximum speed of the scanning carriage. These are, among others, the number of nozzles in the marking head array, the drop generation rate, the drop velocity, the carriage motor characteristics, and the data rate. While it is sometimes possible to increase the speed of recording by a small increment, such a change is often inconvenient or trivial in a given printer.

It is an object of the present invention to multiply the printing speed of a multi-color printer, when operated in the monochrome mode, by a factor of two or three, or more by selectively vertically repositioning at least one of the cartridge holders so that at least two cartridges of the same color will be able to print simultaneously at least two adjacent lines during a single line scan.

It is a further object of the present invention to provide a dynamic elevating arrangement which will simply, efficiently and accurately move the repositionable holder and its cartridge to a raised position.

It is another object of the present invention to provide a static elevating arrangement in which the cartridge holder is designed to accept a repositionable cartridge only in an elevated position.

It is another object of the present inventin to provide a monochrome printer with the capability of printing a second line simultaneously at different selected line spacings.

SUMMARY OF THE INVENTION

These and other objects may be achieved, in one form, by providing a printing apparatus having a scanning carriage movable transversely across a recording medium and carrying thereon a plurality of marking head cartridges at a first level. At least one of the head cartridges is repositionable so as to be elevated to a second level. The first and second levels represent subsequent print lines. Elevation may be achieved either dynamically by means of a movable cartridge holder or statically by means of a unique cartridge seating arrangement. Thus, when the repositionable cartridge is elevated, it is possible to print simultaneously on the first and second levels, i.e. printing two lines during a single scan, thereby doubling the speed of operation. It is also comprehended by this invention that another repositionable cartridge may be elevated to a third level, for tripling the speed of operation.

BRIEF DESCRIPTION OF DRAWINGS

Other objects and further features and advantages of this invention will be apparent from the following, more particular, description considered together with the accompanying drawings, wherein.

DETAILED DESCRIPTION OF THE ILLUSTRATED EMBODIMENTS

Figure 1:
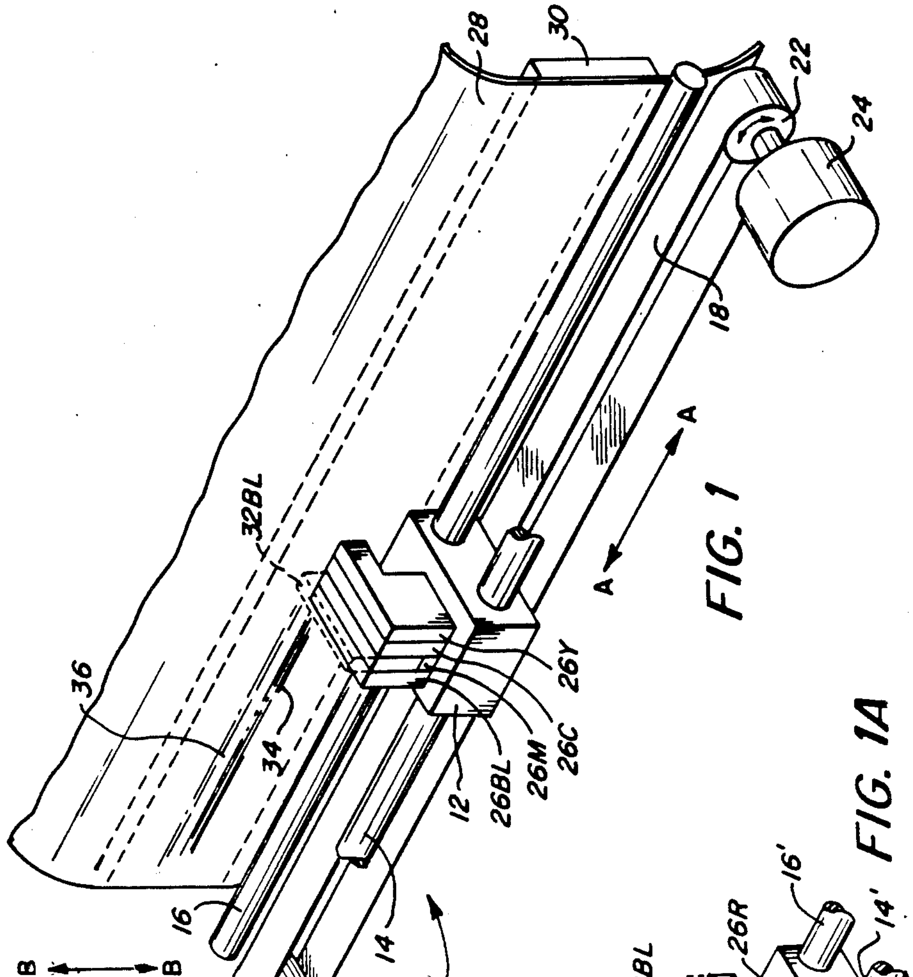
FIG. 1 is a perspective view schematically illustrating the present invention incorporated in a full-color scanning-type printer.

Turning now to FIG. 1, there is shown a multi-color printing mechanism 10 including a carriage 12 mounted for reciprocation (in the direction of arrow (A) upon guide rails 14 and 16 secured to the frame (not shown) of the printer. Although the mechanism will be described in the context of an ink jet printer, it should be understood that the present invention has equal applicability to any type of scanning array printer. The carriage is driven rightwardly and leftwardly upon the guide rails by any suitable mechanism such as a drive belt 18 supported between idler pulley 20 and drive pulley 22, and driven by motor 24. A number of recording head cartridges 26Y, 26C, 26M and 26BL (for delivering yellow, cyan, magenta and black ink) may be mounted in a cartridge holder, provided on the carriage 12, in order to make full-color recordings. Each cartridge holder will include the appropriate mechanical, electrical and fluidic couplings for its respective head cartridge, so that the arrays of ink drivers may be activated in response to a drive signal to expel the inks through the arrays of nozzle orifices onto a recording substrate 28, such as paper, supported upon a platen 30. During full-color operation, the head cartridges 26(Y,C,M,BL) are normally positioned so that their marking arrays are located on a first level. Similarly, in FIG. 1A highlight color recording is accomplished by scanning a recording substrate with two head cartridges, one black 26BL and one red 26R. In the past when it was desired to record information solely in black, 26BL was operated and the three other cartridges 26Y, 26C and 26M, or the highlight color cartridge 26R, were unused.

It is the purpose of the present invention to dramatically increase the speed of printing by utilizing at least one of the unused cartridge locations for another black head cartridge 32BL. This is shown in dotted lines in FIGS. 1 and 1A in which 32BL is elevated to a second level. As the carriage 12 reciprocates in front of the recording substrate 28, two lines of information 34 and 36 are recorded simultaneously. This doubles the speed of printing. It is also possible, during monochrome printing, to replace others of the unused first level recording heads with a repositionable head cartridge of the monochrome color and to provide an elevating arrangement to reposition them to a third or higher level.

Figure 2:
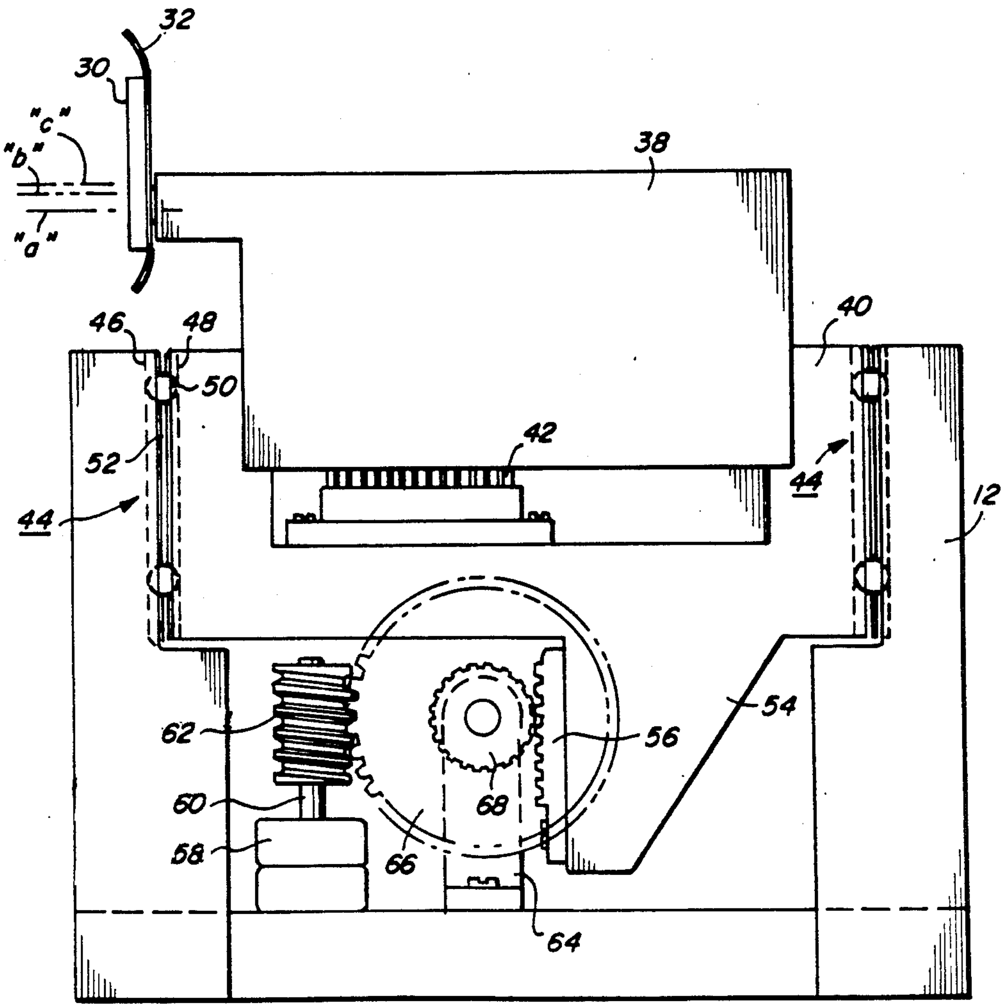
FIGS. 2 is a side elevation view illustrating one embodiment of the repositioning mechanism for dynamically repositioning a recording head cartridge.

Several embodiments of elevating structure are illustrated. In FIG. 2, a recording head cartridge 38 is shown mounted in a vertically movable cartridge holder 40 provided on the carriage 12. The cartridge is located to be slightly spaced from the recording substrate 28 supported by platen 30. A line height array of nozzle orifices (not shown) dispenses ink upon the substrate as the carriage scans across the substrate. The "home", or first level position of the cartridge array is indicated by its centerline "a". Suitable physical, electrical and fluidic interconnections are made between the head cartridge and the cartridge holder. By way of example, only the electrical connector 42 is shown. In order to faciliate smoothness of movement for accurate vertical positioning of the head cartridge linear bearing 44 is provided on opposing supporting walls. The linear bearing includes grooves 46 and 48 formed respectively in the carriage body and cartridge holder, ball elements 50 seated within the grooves, and separators 52 for properly positioning the balls. Extending downwardly from the bottom of the cartridge holder is an arm 54 to which is secured a gear rack 56.

The repositioning drive system comprises a motor 58 (preferably of the stepper type) upon whose output shaft 60 is mounted a worm 62. A support arm 64 secured to the carriage supports a worm gear 66 which, in turn, drives coaxially mounted pinion 68 that meshes with rack 56. As this arrangement includes a large gear reduction, it allows the use of a very small motor and additionally it improves the accuracy of positioning by requiring a large number of motor steps for a small movement of the cartridge holder. The correct number of steps can be selected to move the head cartridge 38 from its home position ("a") to the desired second level positions of "b" or "c" representing the array centerline at a line spacing of six or eight lines per inch.

Figure 4:
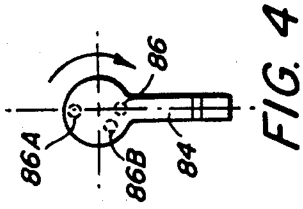
FIG. 4 is a view taken substantially in the direction of line 4—4 of FIG. 3 showing a repositioning adjustment handle.
Figure 3:
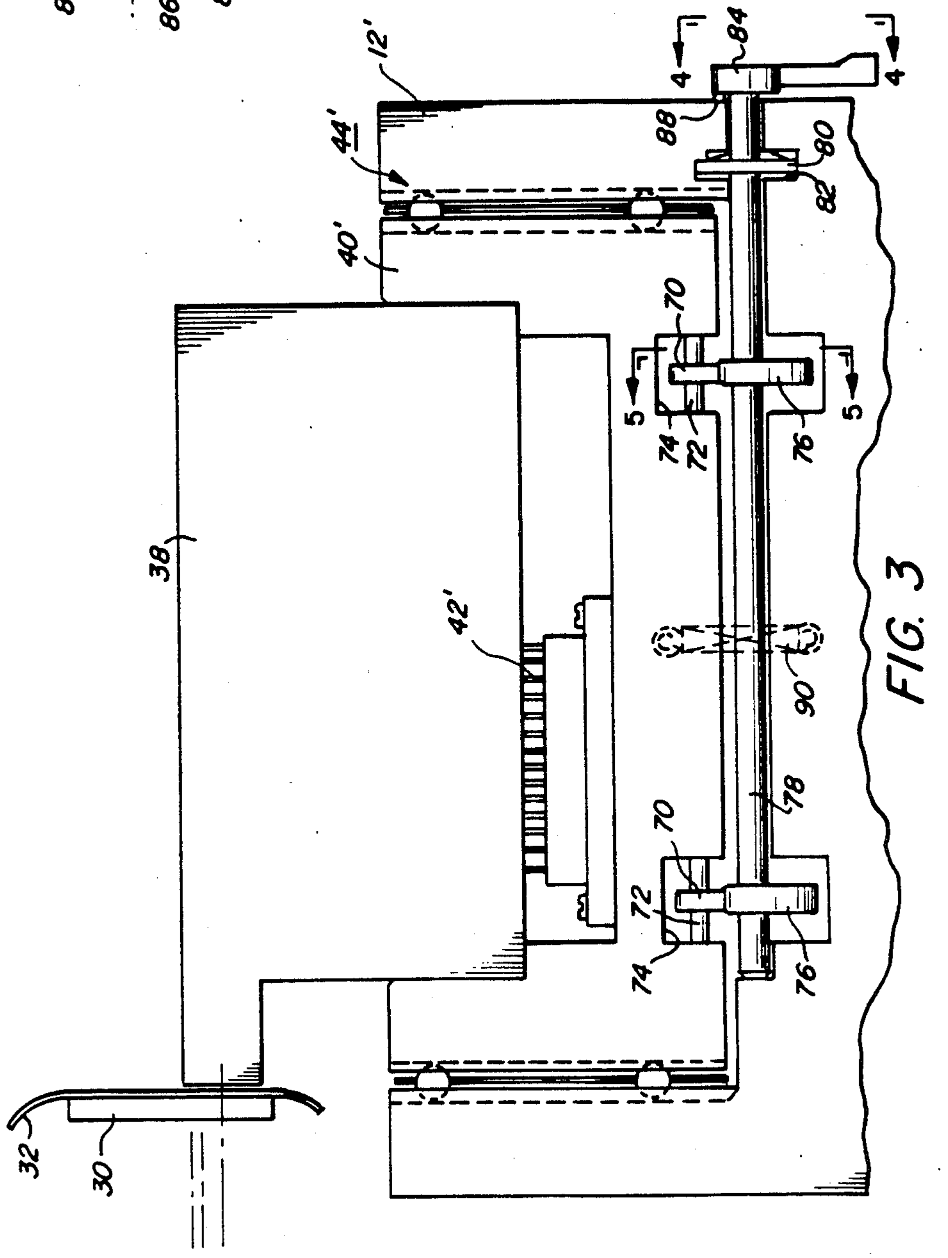
FIG. 3 is a side elevation view showing another embodiment of the repositioning mechanism for dynamically repositioning a recording head cartridge.
Figure 5:
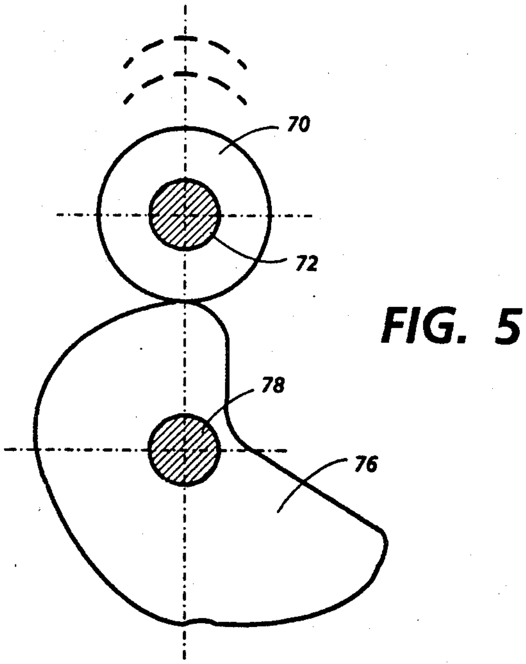
FIG. 5 is a view taken substantially in the direction of line 5—5 of FIG. 3 showing an elevating cam.
Figure 6:
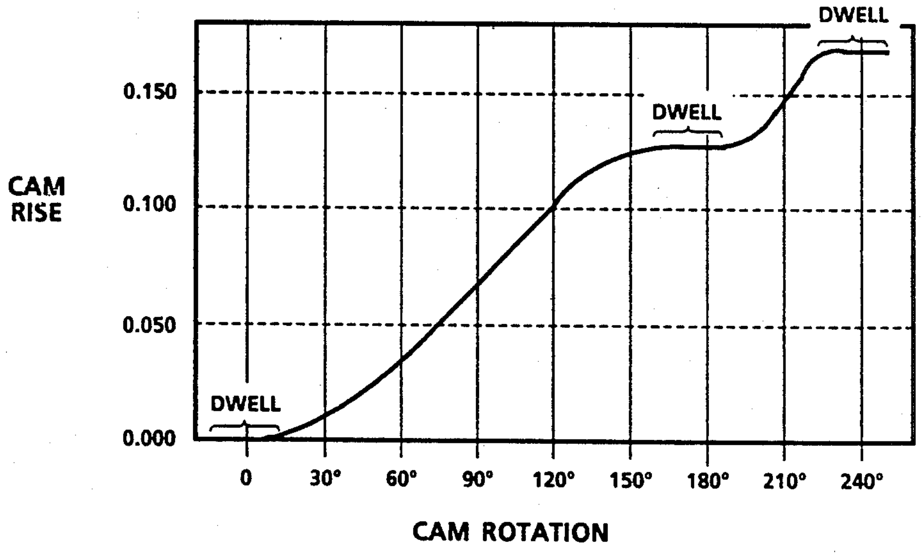
FIG. 6 is a graph illustrating the cam action profile of the cam of FIG. 5.

An alternative, manually operated, repositioning mechanism is shown in FIG. 3 and related FIGS. 4, 5 and 6. Elements similar to those of the FIG. 2 structure bear the same identification numerals with a prime (') added, and will not be described. This elevating mechanism includes cam follower rollers 70 supported upon shafts 72, secured in cavities 74 of cartridge holder 40'. Associated with each cam follower roller is a cam 76, each of which is mounted upon cam shaft 78 secured in the carriage 12'. Also mounted upon the cam shaft are a spring washer 80 housed in seat 82 in the carriage 12' and a handle 84. The biasing action of the spring washer against its seat urges the handle 84 against the carriage so as to urge one of three positioning detents **86*a*, 86*b*, or 86*c* into a seat 88** in the carriage wall.

In FIG. 4, the handle 84 is in its "home" position. As the handle is moved in a clockwise direction, the cartridge holder 40' is vertically elevated against the bias of tension spring 90 having one end secured to the carriage 12 and its other end secured to the cartridge holder. The spring urges these two bodies together so as to bias the cam follower rollers against their respective cams. A cam profile is illustrated in FIG. 5 and its displacement diagram is illustrated in FIG. 6. Cam 76 has dwells at about the 0° or "a" position, at about the 180° or "b" position and again at about the 240° or "c" postion. As explained above, the "a" position represents the centerline of the first level, or "home" position, and the "b" and "c" positions represent the centerlines of two possible second levels. The "b" centerline is elevated by 0.125 inches (8 lines/inch) above the "a" centerline and the "c" centerline is elevated by 0.167 inches (6 lines/inch). Since the dwells each subtend an angle of about 20°, slight angular deviation of the cam is not critical, thus allowing accurate positioning of the movable head cartridge regardless of the precise positioning of cam 76 upon shaft 78 or precise manual rotation of handle 84.

Figure 7A:
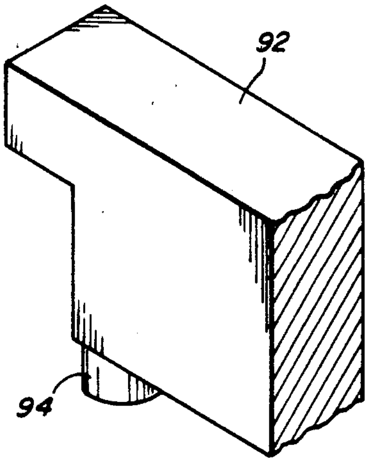
FIG. 7A is a schematic perspective view of a portion of a head cartridge showing a static repositioning element.
Figure 7B:
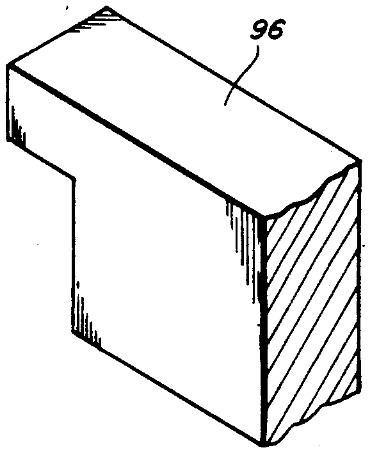
FIG. 7B is a schematic perspective view of a portion of a head cartridge provided with no repositioning element.
Figure 7C:
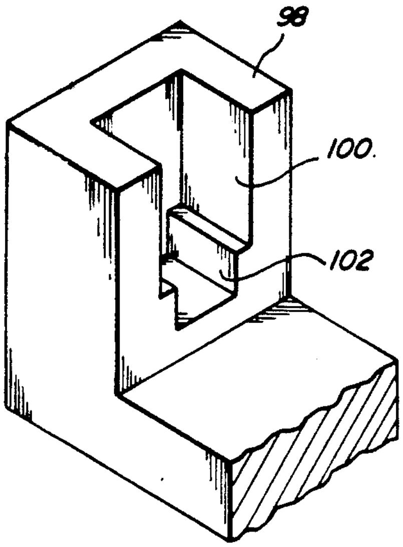
FIG. 7C is a schematic perspective view of a portion of a head cartridge holder designed to receive the head cartridge of FIG. 7A at a first level.
Figure 7D:
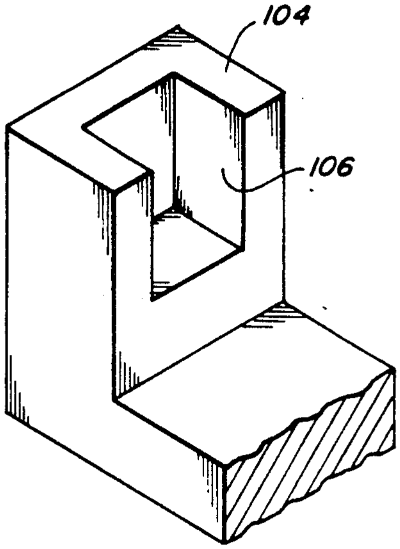
FIG. 7D is a schematic perspective view of a head cartridge holder designed to receive the head cartridge of FIG. 7B at a first level and the head cartridge of FIG. 7A at a second level.

The FIGS. 7A, 7B, 7C and 7D partial schematic drawings illustrate a static elevating arrangement wherein each cartridge, when seated in a cartridge holder, will be located at its proper height in accordance with a predetermined mounting relationship. Cartridges 92 containing black ink would be configured as shown in FIG. 7A, i.e. having a key protrusion 94 (one protusion is preferably provided at each end of the cartridge to insure its stability). Cartridges 96 containing other ink colors would be configured with no key protrusion, as shown in FIG. 7B. Cartridge holders 98, of the FIG. 7C type, receive a cartridge in seat 100 having undercut 102 for receiving the key protrusion 94 of a black cartridge so as to locate its marking array at the first level. Cartridge holders 104 of the FIG. 7D type, receive a cartridge in seat 106 having no undercut, so that the non-black ink cartridges 96 will be located with their marking arrays at the first level and black ink cartridges 92 will be located with their marking arrays at the second level. By modifying the height of the key protrusion 94, it is possible to locate the second level at some other distance from the first level, such as at the "b" or "c" position. Therefore, when it is desired to print monochromatically, one of the non-black head cartridges is removed and replaced by a standard black cartridge which will automatically be elevated by virtue of its key protrusion.

Figure 1A:
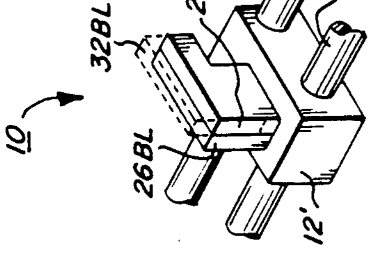
FIG. 1A is a perspective view showing the carriage of FIG. 1 illustrating the present invention incorporated in a highlight color scanning-type printer.
Figure 8:
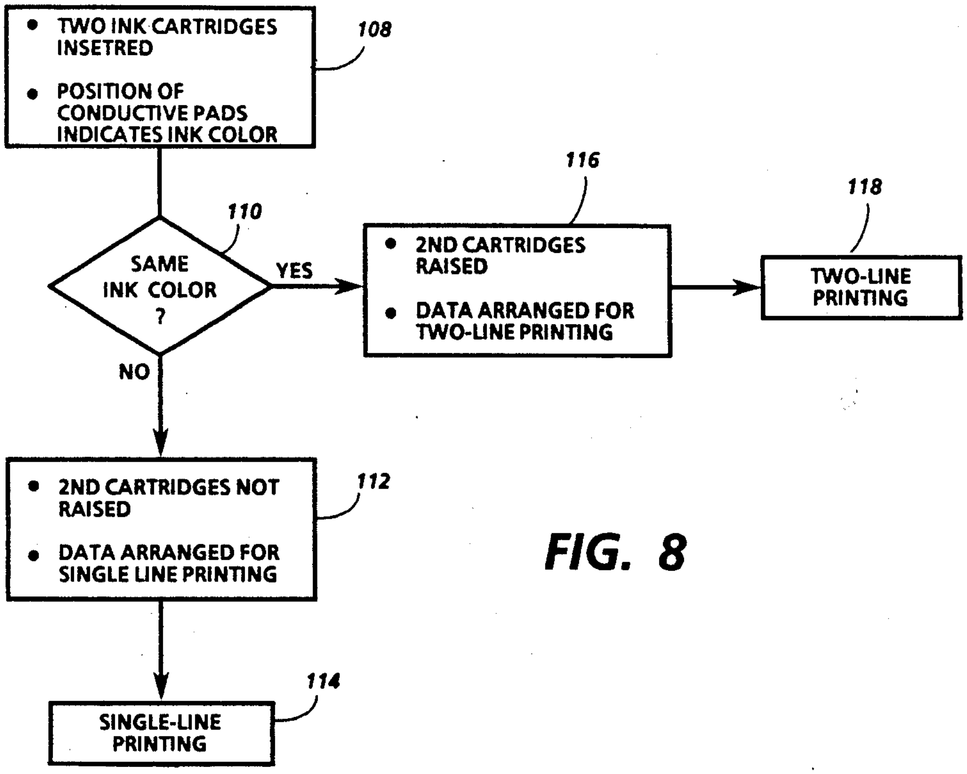
FIG. 8 is a functional flow chart illustrating the automatic operation of the repositionable marking head.

The flow chart of FIG. 8 illustrates the automatic operation of the multicolor printer of this invention, as shown either in the full-color embodiment of FIG. 1 or in the highlight color embodiment of FIG. 1A, under the control of a printer microprocessor (not shown). It is assumed for the purposes of the following explanation that only one head cartridge will be repositionable and that one will represent the monochrome recording cartridge. It is further assumed that each cartridge will bear a conductive pad, or other identifying signal generator, such as a switch actuating pin, which can be sensed by the printer to determine the color of ink therein. As indicated at 108, each of the monochrome and repositionable cartridges 26 is interrogated to determine the color of its ink. A comparison is made at 110 to determine whether or not the repositioning command is to be executed. If the inks are not the same color, the instruction 112 is provided so that the repositionable cartridge is not raised and the data is arranged for single line full-color or highlight color printing, which is then accomplished at 114. If the inks are the same color, the instruction 116 is provided so that the repositionable cartridge is raised to the second level and the data is arranged for two-line printing, which is then accomplished at 118.

It should be understood that the present disclosure has been made only by way of example, and that numerous changes in details of construction and the combination and arrangement of parts may be resorted to without departing from the true spirit and scope of the invention as hereinafter claimed.

What is claimed is:

1. A printing apparatus including a carriage reciprocably movable in a line scan direction and supporting a plurality of marking devices thereon for recording a line of information upon a recording medium, said apparatus being characterized by including holder means supported upon said carriage for removably receiving said plurality of marking devices normally at a first level so as to record a single line of information with said marking devices as said carriage is reciprocated relative to said recording medium, and static repositioning means associated with said holder means and said marking devices for selectively positioning at least one of said marking devices relative to the other ones of said marking devices at a second level for recording more than one line of information during a single line scan of said carriage, said at least one of said marking devices includes a mounting feature,and said holder means includes receiving means capable of accepting said mounting feature, so that when said receiving means accepts said mounting feature, said at least one of said marking devices is located at said first level, and when said receiving means does not accept said mounting feature, said at least one of said marking devices is located at said second level.

2. The printing apparatus as defined in claim 1 characterized by said marking devices including inks of different colors for recording said line of information, and wherein when said at least one of said marking devices includes ink of the same color as one of said other ones of said marking devices its mounting feature is not accepted by said receiving means and it is movable to said second level for recording more than one line of information in said same color during a single line scan.

3. A method of printing including the steps of mounting two marking devices into a holder supported upon a scanning carriage, comparing identifying elements appearing on each of said marking devices to determine if they are the same, if said identifying elements are different, then arranging the marking data to said marking devices for single line printing, and if said identifying elements are the same, then elevating one of said marking devices and arranging the marking data to said marking devices for twoline printing.

* * * * *